(12) United States Patent
Shimomaki (10) Patent No.: US 8,467,022 B2
(45) Date of Patent: Jun. 18, 2013

(54) LIQUID CRYSTAL DISPLAY DEVICE

(75) Inventor: Shinichi Shimomaki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 901 days.

(21) Appl. No.: 12/571,654

(22) Filed: Oct. 1, 2009

(65) Prior Publication Data
US 2010/0085287 A1    Apr. 8, 2010

(30) Foreign Application Priority Data

Oct. 8, 2008   (JP) ................................. 2008-262221

(51) Int. Cl.
*G02F 1/1337* (2006.01)

(52) U.S. Cl.
USPC ......................................................... 349/129

(58) Field of Classification Search
USPC ......................................................... 349/129
See application file for complete search history.

(56) References Cited

U.S. PATENT DOCUMENTS

| 7,345,728 | B2 | 3/2008 | Lee et al. |
| 2002/0030654 | A1 | 3/2002 | Igeta et al. |
| 2002/0067322 | A1 | 6/2002 | Yanagawa et al. |
| 2005/0068483 | A1 | 3/2005 | Lee et al. |
| 2007/0075947 | A1 | 4/2007 | Yanagawa et al. |
| 2008/0007666 | A1 | 1/2008 | Takeda et al. |
| 2008/0074602 | A1 | 3/2008 | Arai et al. |
| 2009/0015762 | A1 | 1/2009 | Noguchi |
| 2010/0157222 | A1 | 6/2010 | Arai et al. |

FOREIGN PATENT DOCUMENTS

| JP | 2001-174818 A | 6/2001 |
| JP | 2002-169179 A | 6/2002 |
| JP | 2003-270653 A | 9/2003 |
| JP | 2005-107535 A | 4/2005 |
| JP | 2007-233317 A | 9/2007 |
| JP | 2008-33311 A | 2/2008 |
| JP | 2009-15204 A | 1/2009 |
| KR | 2002-0021350 A | 3/2002 |
| KR | 2003-0048653 A | 6/2003 |
| KR | 2008-0028818 A | 4/2008 |

OTHER PUBLICATIONS

Japanese Office Action in counterpart Japanese Patent Application JP2008-262221, dated Oct. 5, 2010, Partial translation of the Office Action is attached as a concise explanation of relevance.
Chinese Office Action in a counterpart application No. 200910179174.8, dated Apr. 13, 2011.
Korean Office Action dated Feb. 21, 2011, in a counterpart Korean patent application No. 10-2009-0093758.

*Primary Examiner* — Phu Vu
(74) *Attorney, Agent, or Firm* — Chen Yoshimura LLP (57) ABSTRACT

A liquid crystal display device comprising: a liquid crystal layer provided between a first substrate and a second substrate; first electrodes, which are formed above the first substrate as a first layer, each first electrode having a side which extends to incline toward a first direction in which the data line extends, that is, second direction, each first electrode electrically connected to corresponding data line via corresponding switching device; and a second electrode, which is formed above the first substrate as a second layer, having a slit in each part of the area overlapping with corresponding first electrode, at least one side of the slit extending in the second direction.

13 Claims, 5 Drawing Sheets

LIQUID CRYSTAL DISPLAY DEVICE

This application is based upon and claims the benefit of priority from the prior Japanese Patent Application No. 2008-262221, filed Oct. 8, 2008, the entire contents of which are incorporated herein by reference.

BACKGROUND OF THE INVENTION

1. Field of the Invention

The present invention relates to a liquid crystal display device wherein liquid crystal molecules are aligned substantially in parallel to a substrate surface by rotation control.

2. Description of the Related Art

Liquid crystal display devices using an in-plane switching type are well known. A liquid crystal layer of these devices is provided between a pair of substrates placed opposite to each other at a given distance, ensuring that liquid crystal molecules are aligned substantially in parallel to a substrate surface, with their long axes aligned in a certain direction. On the internal surface of one of the substrate pair, pixel electrodes and a common electrode are formed, insulated from each other, to generate electric field. The electric field controls each liquid crystal molecule to align substantially in parallel to the substrate surface. For example, a thin-film transistor is placed in each region enclosed with top and bottom scanning lines and right and left data lines, a control electrode of the thin-film transistor is connected to a scanning line, an input electrode of the thin-film transistor is connected to a data line, and an output electrode of the thin-film transistor is connected to the pixel electrode. Data lines and pixel electrodes are formed on an interlevel insulating layer containing a gate insulating film. The common electrode is provided above pixel electrodes and the interlevel insulating layer via another interlevel insulating layer. The common electrode has a plurality of slits, namely openings penetrating in the thickness direction. The method of generating an in-plane electric field between the edge of each slit and the solid pixel electrode may be called the fringe field switching (FFS) method. In FFS method, a structure extending slits in parallel to a scanning line or data line and a dog-leg structure extending not in parallel to a scanning line or data line (FIG. 12 of JP2007-233317 and JP2005-107535) are known. With the latter, the electric field applied between the common electrode and the pixel electrode acts in the direction obliquely crossing the long axes of the liquid crystal molecules in the initial alignment state, aligning the direction of the liquid crystal in the initial alignment state and thus ensuring uniform brightness. In addition, this structure forms multiple domains that divide the alignment direction of liquid crystal molecules in one pixel, further expanding viewing angle, which is why this structure is often adopted.

In liquid crystal display devices having such structure, pixel electrodes and data lines are placed on a same plane, namely on an interlevel insulating layer including a gate insulating film. Furthermore, to improve transmittance, pixel electrodes are placed as widely as possible in each area enclosed with the top and the bottom scanning lines and the right and the left data lines, with one of their sides kept in parallel to the data lines. Consequently, the intervals between the left edge of the pixel electrode and the left data line, and between the right edge of the pixel electrode and the right data line are made extremely short, increasing the possibility of occurrence of short circuit between the right or left edges of the pixel electrode and the data line in the manufacturing process and thus decreasing yield.

SUMMARY OF THE INVENTION

A purpose of the present invention is to provide a liquid crystal display device resistant to direct short circuit between a pixel electrode and a data line adjacent to the pixel electrode to solve the problem of the conventional devices described above.

One aspect of the present invention provides the liquid crystal display device, comprising: a liquid crystal layer provided between a first substrate and a second substrate; first electrodes, which are formed above the first substrate as a first layer, each first electrode having a side which extends to incline toward a first direction in which the data line extends, that is, second direction, each first electrode electrically connected to corresponding data line via corresponding switching device; and a second electrode, which is formed above the first substrate as a second layer, having a slit in each part of the area overlapping with corresponding first electrode, at least one side of the slit extending in the second direction.

Another aspect of the present invention provides the liquid crystal display device comprising: a liquid crystal layer provided between a first substrate and a second substrate; pixel electrodes, which are formed above the first substrate as a first layer, each pixel electrode having a side which extends to incline toward a first direction in which the data line extends, that is, second direction, each pixel electrode electrically connected to corresponding data line via corresponding switching device; and a common electrode, which is formed above the first substrate as a second layer, having slits in each area overlapping with corresponding pixel electrode, at least one side of the slit extending in the second direction.

Another aspect of the present invention provides a liquid crystal display device comprising: a liquid crystal layer provided between a first and a second substrates; first electrodes, which are formed above the first substrate as a first layer, each first electrode having one side which extends to incline toward a first direction in which the data line extends, that is, second direction, and other side which extends in a third direction, which is symmetrical to the second direction with respect to the axis of the direction orthogonal to the first direction, each first electrode electrically connected to corresponding to the data line via corresponding switching device; and a second electrode, which is formed above the first substrate as a second layer, having a pair of slits in at least each part of the area overlapping with each first electrode, and at least one side of a slit of the pair extending in the second direction, and at least one side of another slit extending in the third direction.

A liquid crystal display device according to the present invention can be made resistant to direct short circuit between a pixel electrode and a data line that is placed adjacent to the pixel electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

[First Embodiment]

Figure 1:
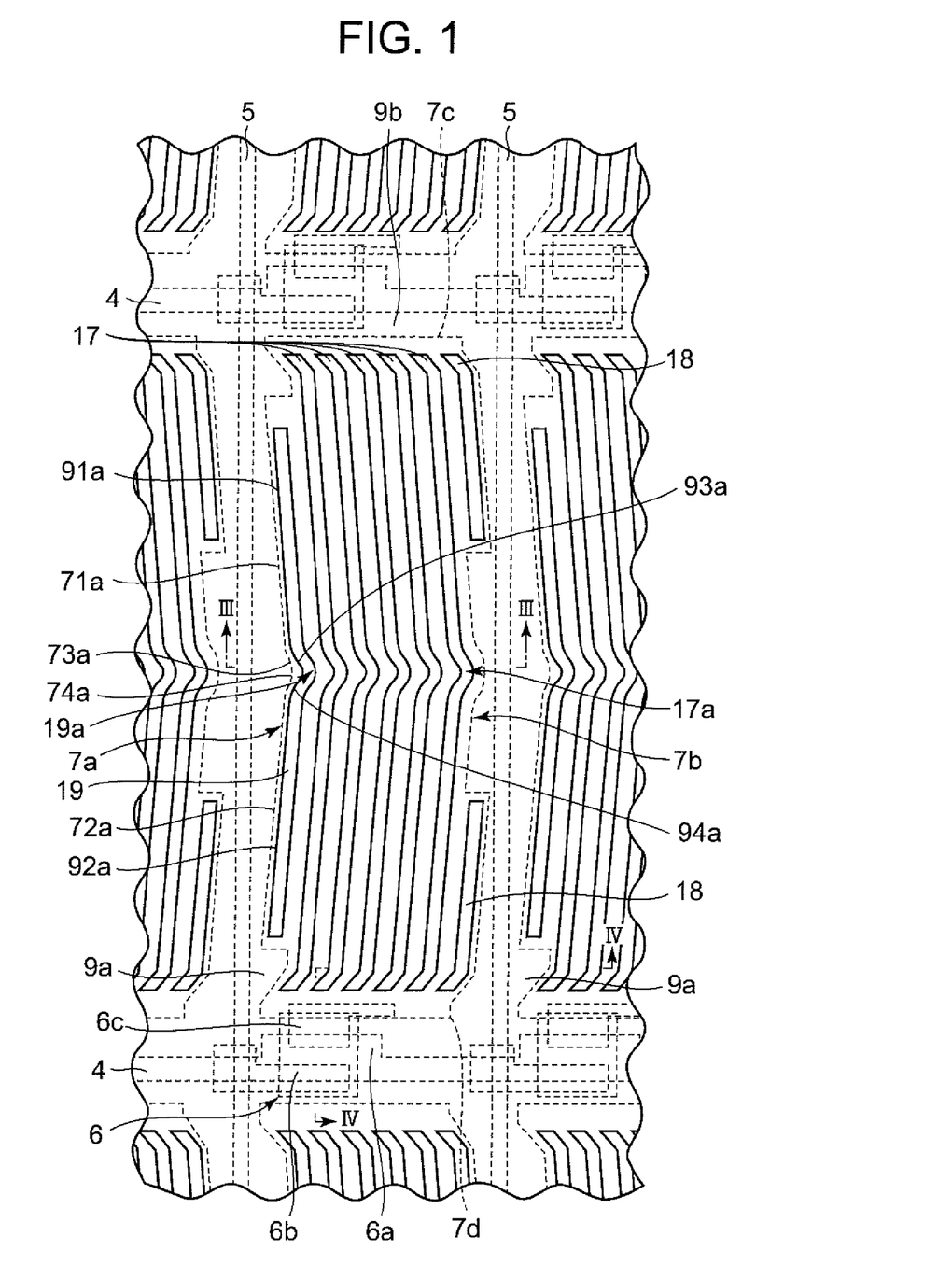
FIG. 1 is a plan view of a liquid crystal display device according to the first embodiment of the present invention.
Figure 2:
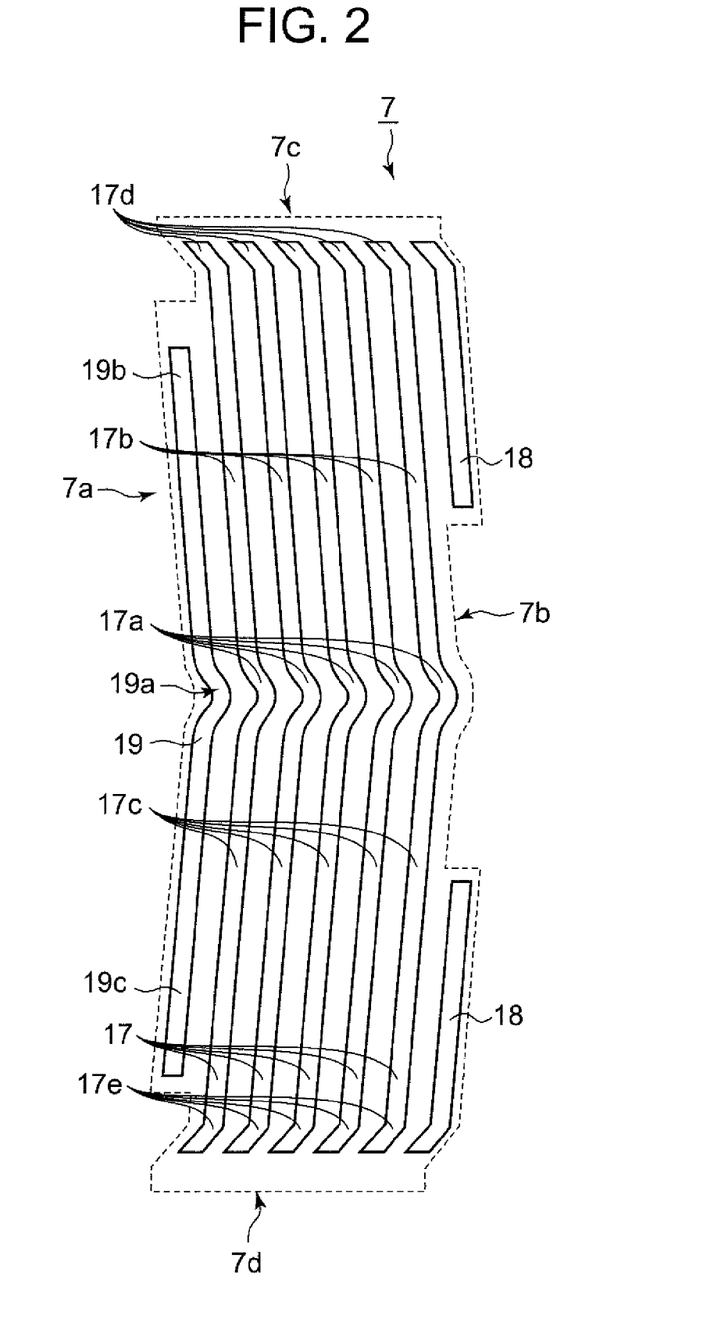
FIG. 2 is a diagram illustrating the pattern of pixel electrode and common electrode in a unit area of the liquid crystal display device shown in FIG. 1.
Figure 3:
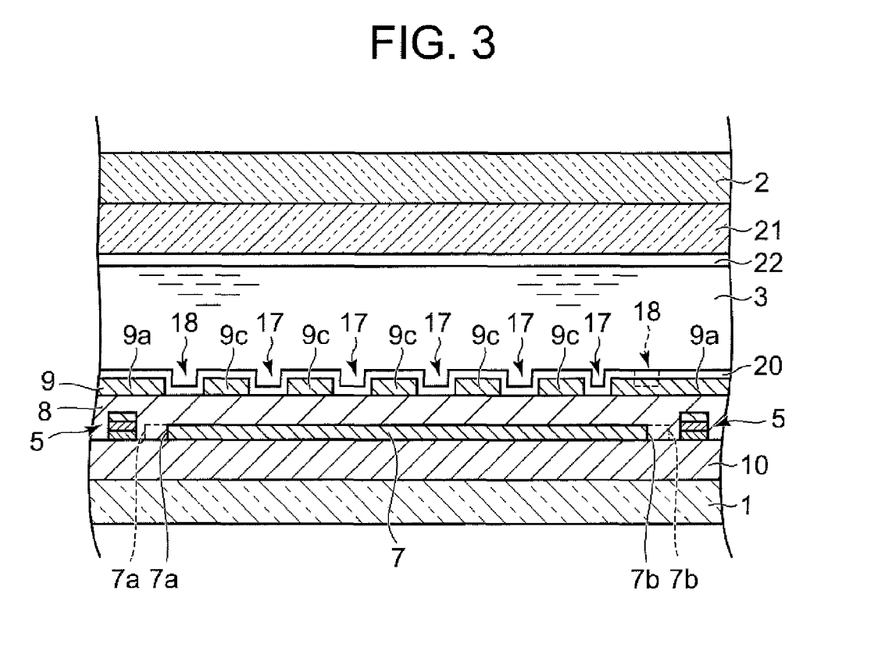
FIG. 3 is a cross-sectional view taken along the line of III-III of FIG. 1.
Figure 4:
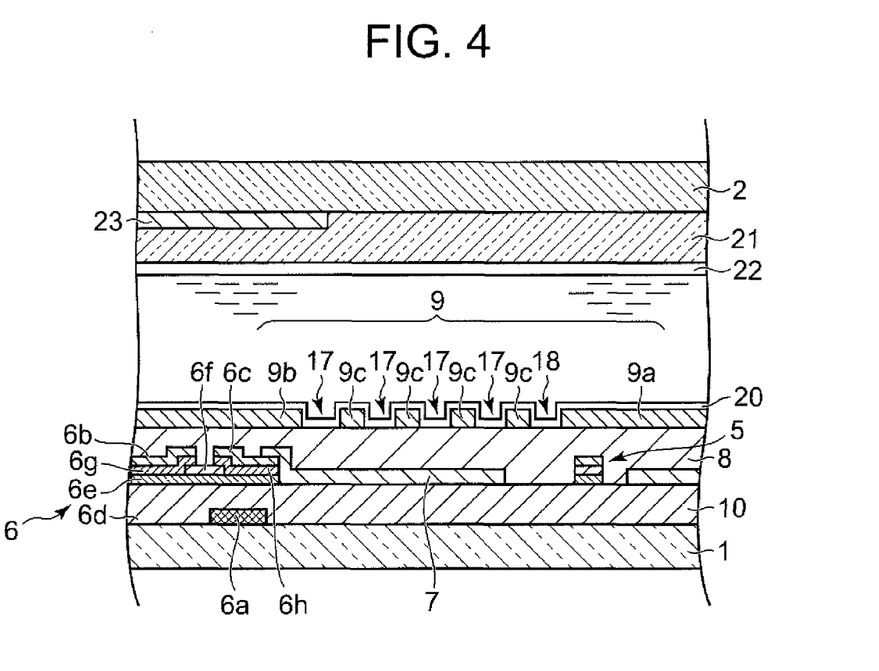
FIG. 4 is a cross-sectional view taken along the line of IV-IV of FIG. 1.

FIGS. 1 to 4 illustrate a first embodiment of the present invention. FIG. 1 is a plan view of the liquid crystal display device, FIG. 2 is a plan view illustrating the positional relation between the pixel electrode and the common electrode in a unit area, FIG. 3 is a cross-sectional view of FIG. 1 along the line III-III, and FIG. 4 is a cross-sectional view of FIG. 1 along the line IV-IV.

A liquid crystal display device related to the first embodiment of the present invention includes a pair of substrates 1 and 2 placed opposite to each other at a certain distance, a liquid crystal layer 3 provided between the pair of substrates 1 and 2 in parallel to the substrate surface, with the long axes of liquid crystal molecules aligned in specified direction, a plurality of scanning lines 4 extending in the row direction on the side of one of the substrate pair (on the side of the first substrate 1 in the case of the figure), a plurality of data lines 5 extending in the column direction crossing the scanning lines 4 on the side of one of the substrate pair, a plurality of switching devices 6, each of which is provided in an area enclosed by the top and the bottom scanning lines 4 and the right and the left data lines 5 (referred to as "unit area" or "display pixel area"), a plurality of pixel electrodes 7, each of which is formed in each unit area and connected to a corresponding switching device 6, an interlevel insulating layer 8 formed on the pixel electrodes 7, data lines 5, and switching devices 6, and a common electrode 9 formed on the interlevel insulating layer 8 on the side of the liquid crystal layer 3.

Each switching device 6 has a gate electrode (control electrode) 6a, a source electrode (input electrode) 6b, and a drain electrode (output electrode) 6c in each area enclosed by the top and the bottom scanning lines 4 and the right and left data lines 5. The gate electrode 6a is connected to a corresponding scanning line 4, whereas the source electrode 6b is connected to a corresponding data line 5. A thin-film transistor (TFT) is used as the switching device 6, for example.

Each TFT 6 includes a gate insulating film 6d forming part of the insulating layer 10, which covers the entire surface of the first substrate 1 over a gate electrode 6a formed on the first substrates 1, an i-type semiconductor layer 6e formed on the gate insulating film 6d facing opposite to the gate electrode 6a, an etching stopper layer 6f for protecting the channel area of the i-type semiconductor layer 6e, ohmic contact layers 6g and 6h formed of n-type semiconductor facing opposite to each other and partially covering the etching stopper layer 6f, a source electrode 6b formed on one of the ohmic contact layers 6g, and a drain electrode 6c formed on the other ohmic contact layer 6h.

Each scanning line 4 is connected to the gate electrode 6a of each TFT 6 placed in a corresponding row. Each data line 5 is connected to the source electrode 6b of each TFT 6 placed in a corresponding column.

Each pixel electrode 7, made of a transparent conductive film such as indium tin oxide (ITO) film, is formed on the insulating layer 10, partially covering a part of the drain electrode 6c of the corresponding TFT 6 in each unit area. The pixel electrode 7 in each unit area has a left edge 7a and a right edge 7b, both of which extend in the column direction. The distance between the left edge 7a or the right edge 7b and the data line 5 on each side varies depending on the position in the column direction. As shown in FIG. 1, the left and right edges 7a and 7b extend along the data line 5 adjacent to each of them. The left and right edges 7a and 7b are formed to extend in a different direction from the direction in which the data line 5 extends, therefore, the left and right edges 7a and 7b have a protruding portion and a convex portion. Since the distance between the left edge 7a or the right edge 7b and the data line 5 varies depending on the position in the column direction, the probability of occurrence of short circuit between the pixel electrode 7 and the data line 5 due to attachment of cleaning agent, etc. in the liquid crystal manufacturing process decreases. The left and right edges 7a and 7b are formed, matched with the shape of the common electrode 9, for example. Details will be detailed later.

The interlevel insulating layer 8 is formed, covering pixel electrodes 7, TFT 6, and data lines 5 over the entire surface, on the side of one of the substrates 1. A common electrode 9 is formed on this interlevel insulating layer 8, expect the area above the TFT 6 as required. The pixel electrode 7 and the common electrode 9 are electrically insulated from each other.

The common electrode 9, made of a transparent conductive film for example ITO, has a vertical edge 9a that covers the left and the right edges 7a and 7b of the pixel electrode 7 and the data lines 5 via the interlevel insulating layer 8, extending over the adjacent unit areas, a horizontal edge 9b that covers the upper and the lower edges 7c and 7d of the pixel electrode 7 via the interlevel insulating layer 8, except for the area over the TFT 6, extending over the adjacent unit areas, and a main portion 9c that covers the pixel electrode 7 via the interlevel insulating layer 8. The main portion 9c has a plurality of first slits 17 extending in the column direction and placed at given intervals in the row direction, a pair of second slits 18, and a third slit 19. When a voltage is applied between the pixel electrode 7 and each edge of the first slits 17, the pair of second slits 18, the third slit 19, the vertical edge 9a, and the horizontal edge 9b, horizontal electric field is generated to control the alignment direction of each liquid crystal molecule of the liquid crystal layer 3.

The widths of the first slits 17, second slit pair 18, and third slit 19 are same. Namely, the sides of each slit extend in parallel to each other.

The pixel electrode 7 is detailed below.

As shown in FIGS. 3 and 4, the pixel electrode 7 is interposed between left and right data lines 5 and 5, and formed on a plane where left and right data lines 5 and 5 exist. The pixel electrode 7 has a left edge 7a that runs along the left data line 5 and a right edge 7b that runs along the right data line 5 respectively. As shown in FIGS. 1 and 2, the right edge 7b of the pixel electrode 7 placed close to the right data line 5 does not extend in parallel to the right data line 5. Namely, the distance between the right edge 7b and the right data line 5 varies depending on the position. Similarly, the left edge 7a placed close to the left data line 5 does not extend in parallel to the left data line 5. Namely, the distance between the left edge 7a and the left data line 5 varies depending on the position.

At the right edge of the main portion 9c of the common electrode 9, a bent portion 17a is formed approximately in the middle of the two adjacent scanning lines 4 and 4 on the rightmost first slit 17. At the both sides of the scanning lines 4, a pair of second slits 18 is formed at further right than the rightmost first slit 17. Consequently, at the both sides of the adjacent scanning lines 4, a portion corresponding to each second slit 18 on the right edge 7b of each pixel electrode 7 is formed at further right than a portion corresponding to a bent portion 17a in the rightmost first slit 17. In FIG. 3, the right edge 7b of the pixel electrode 7 shown in a dotted line corresponds to the closest portion to the rightmost data line 5. As shown in the figure, it is disposed to closer to the right data line 5 than a bent portion 17a of the first slit 17 and the second slit 18. In other words, the right edge 7b of the pixel electrode 7 runs sufficiently away from the right data line 5 in areas other than the position at which the second slit 18 comes closest to the right data line 5.

At the left edge of the main portion 9c of the common electrode 9, a portion corresponding to a bent portion 19a of the third slit 19 is formed in the right middle between two adjacent scanning lines 4 and 4. Consequently, the left edge 7a of the pixel electrode 7 is formed away from the left data line 5 in the portion corresponding to the bent portion 19a of the third slit 19, namely in the central area equally away from the two adjacent scanning lines 4 and 4. In FIG. 3, the left edge 7a of the pixel electrode 7 shown in a dotted line represents the area corresponding to the side edge of the third slit 19, which come closest to the left data line. The left edge 7a of the pixel electrode 7 is formed to allow the distance from the left data line 5 to increase gradually along the way toward the middle of the distance between the two adjacent scanning lines 4 and 4.

As described above, the right edge 7b and the left edge 7a of the pixel electrode 7 are formed to ensure that they come close to the right or the left data line 5 at given areas only, and that they remain away from the data line in other areas. Consequently, compared with the case in which the right edge of the pixel electrode is formed in parallel to the data line, the possibility of occurrence of an electrical short circuit between the right edge 7b and the right data line 5 decreases.

Detailed description of the common electrode 9 will be given below.

As described above, the common electrode 9 has a plurality of the first slits 17, a pair of second slits 18, and a third slit 19. The first slits 17 are aligned in the row direction in each unit area. In an area where the first slits 17 are not provided, for example a pair of the second slits 18 is formed in an area for example interposed by the upper and the lower scanning lines 4, between the right data line 5 and the rightmost first slit 17. Furthermore, in an area where the first slits 17 are not provided, between the left data line 5 and the leftmost first slit 17 for example, a third slit 19 is formed.

That is, the first slits 17 are formed in parallel to each other. The pair of the second slits 18 is formed between the first slit 17 that comes closest to the right data line 5 and the right edge of the main portion 9c. Of the second slit pair 18, one is formed close to one of the scanning lines 4 adjacent to each other, whereas the other is formed close to the other scanning line 4. Each first slit 17 includes a bent portion 17a formed at the position that comes closest to the right data line 5, an elongated portion 17b, which extends obliquely upward from the bent portion 17a, and another elongated portion 17c, which extends obliquely downward from the bent portion 17a. Both top and bottom edges of the elongated portions 17b and 17c are bent to form further slanted portions 17d and 17e. Whereas one of the edges of the elongated portion 17b is bent counterclockwise in the planer view to form the further slanted portion 17d, the other elongated portion 17c is bent clockwise to form another further slanted portion 17e. In other words, the upper and lower parts of each first slit 17 are symmetric with respect to the line connecting the leftmost first slit 17 to the rightmost first slit 17 at the bent portion 17a. Each of the first slits 17 is slanted and is not in parallel to the scanning lines 4 or the data lines 5.

A pair of the second slits 18 is formed in an area of the main portion 9c in which the first slits 17 are not provided, for example in the area between the rightmost first slit 17, of all the first slits 17, and the right data line 5. The second slit pair 18 has the same shape as a part of the first slits 17, namely the elongated portions 17b and 17c including the further slanted portions 17d and 17e. Specifically, all of the pairs of the second slits 18 have the same shape as the first slits 17 excluding the bent portion 17a. One of the pair of the second slits 18 is formed closer to one scanning line 4 (on the side of the upper scanning line in the figure), with its upper edge bent counterclockwise in the planer view in the same manner as the upper edge of the elongated portion 17b of the first slits 17. The other of the pair of the second slits 18 is formed closer to the other scanning line (on the side of the lower scanning line in the figure), with its lower edge bent clockwise in the planar view in the same manner as the lower edge of the elongated portion 17c of the first slits 17.

The third slit 19 is formed in an area of the main portion 9c where the first slits 17 are not provided, between the leftmost first slit 17, of all the first slits 17, and the left data line 5 in the figure shown. The third slit 19 has the same shape as the portion of the first slits 17 not including the further slanted portion, with the elongated portions 19b and 19c connected at the bent portion 19a. The third slit 19 is formed in the shape that the upper and the lower portions of it are symmetrical with respect to the line connecting the left and right edges of the third slit 19 at the bent portion 19a.

As described above, in the first embodiment of the present invention, hanger-shaped first slits 17 extending in the column direction are arranged in the row direction. A pair of second slits 18 having the identical shape as the top and bottom portions of the hanger-shaped first slits 17 is formed on the right of the first slits 17, whereas a third slit 19 having the identical shape as a part of the hanger-shaped first slits 17, which is different from the shape of the second slits 18, is formed on the left of the first slits 17.

That is, the main portion 9c of the common electrode 9 includes a plurality of hanger-shaped first slits 17, a pair of the second slits 18, each of which has the same shape as a part of the first slits 17, including the top portion 17d and the bottom portion 17e but not including the bent portion 17a, and a third slit 19, which has the same shape as a part of the first slits 17, including the bent portion 17a but excluding the top and the bottom portions 17b and 17c.

If voltage is applied between the pixel electrode 7 and the common electrode 9, an electric field is generated in the horizontal direction in each gap between the first slits 17, second slits 18 and the third slit 19 formed on the common electrode 9. This horizontal electric field causes each molecule in the liquid crystal layer 3 to rotate on the plane.

The left and the right edges 7a and 7b of the pixel electrode 7 will be described in detail below.

The pixel electrode 7 has a right edge 7b running along the right data line 5 and a left edge 7a running along the left data line 5. In the example shown in the figure, the right edge 7b is bent into the same shape as the bent portion 17a of the first slits 17 in the area approximately in the middle of the two adjacent scanning lines 4, and runs along the second slits 18 toward each of the two adjacent scanning lines 4 in the area closer to the scanning lines 4, with the part closer to the scanning lines 4 coming closer to the right data line 5. On the other hand, the left edge 7a is bent into the same shape as the bent portion 19a of the third slit 19 in the area approximately in the middle of the two adjacent scanning lines 4, away from the left data line 5. The left edge 7a comes closer to the left data line 5 as it runs along the third slit 19 toward each of the two adjacent scanning lines 4, and assumes the same shape as that of the edge of the leftmost first slit 17 at the areas closest to the scanning lines 4.

As described above, in the layer where the pixel electrode 7 and the data lines 5 are formed on the insulating layer 10 including the gate insulating film 6d, the left and the right edges 7a and 7b of the pixel electrode 7 do not extend in parallel to the data lines 5, but run along the shape of the rightmost and leftmost first slits 17, the second slits 18, and the third slit 19 of the common electrode 9 formed above the layer including the pixel electrode 7 and the data lines 5 via the interlevel insulating layer 8. Consequently, the gap between the left edge 7a and the left data line 5 and that between the right edge 7b and the right data line 5 vary in the column direction. As shown in FIGS. 1 and 2, each of the left and the right edges 7a and 7b of the pixel electrode 7 is shaped symmetrical with respect to line III-III passing through the middle point of the length of the data lines 5. Since the gap between the pixel electrode 7 and the data lines 5 thus varies along the column direction, even if the pixel electrode 7 and the data lines 5 are formed on the same insulating layer 10, the possibility of occurrence of short circuit between the pixel electrode 7 and the data lines 5 is minimized, and consequently yield of liquid crystal device manufacturing is improved.

As shown in FIGS. 3 and 4, on the side of one of the substrates 1, an alignment layer 20 is formed, covering the common electrode 9 and the interlevel insulating layer 8, to align each liquid crystal molecule of the liquid crystal layer 3 in parallel to the substrate surface. A deflector 21 is provided under the other substrate 2, and then an alignment layer 22 is provided between the deflector 21 and the liquid crystal layer 3. A light shield layer 23 is provided in a specified area between the deflector 21 and the substrate 2 to cover the area where the switching device 6 is formed, thus preventing malfunction of the switching device 6.

Figure 5:
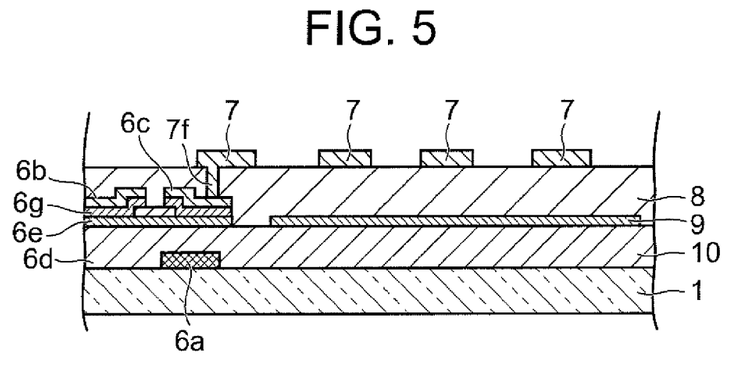
FIG. 5 is a cross-sectional view according to a variation of FIG. 4.

In the first embodiment, each of the pixel electrode 7 and the common electrode 9 may be formed into a shape symmetrical to the one shown in FIG. 2. In the example shown in the figure, the common electrode 9 is formed on the interlevel insulating layer 8, and the pixel electrode is formed on the lower side of the interlevel insulating layer 8. However, the vertical relation of the pixel electrode 7 and the common electrode 9 with respect to the interlevel insulating layer 8 can be reversed, with a pixel electrode 7 having the first or the third slit formed on the interlevel insulating layer and a solid common electrode 9 on the lower side of the interlevel insulating layer 8. In this case, as shown in FIG. 5, a variation of FIG. 4, the drain electrode 6c and the pixel electrode 7 are connected with a pillar interconnect 7f.

As described above and shown in each figure, the liquid crystal display device in the first embodiment of the present invention comprises: a liquid crystal layer 3 provided between one substrate 1 and another substrate 2; pixel electrodes 7, which are formed above the substrate 1 as a first layer, each pixel electrode 7 having a side 71a which extends to incline toward a first direction in which the data line 5 extends, that is, second direction, each pixel electrodes 7 electrically connected to corresponding data line 5 via corresponding switching device 6; and a common electrode 9, which is formed above the substrate 1 as another layer, that is, a second layer, for example, the common electrode 9 having a slit 19 in each part of the area overlapping with corresponding pixel electrode 7, at least one side 91a of the slit 19 extending in the second direction.

A side 91a of the slit 19, which is adjacent to the side 71a of the pixel electrode 7 extending in the second direction, extends in the second direction.

The pixel electrode 7 has a side 72a extending in the third direction, which is symmetrical to the second direction with respect to the axis of the first direction or the direction orthogonal to the first direction, and the side 92a of the slit 19, which is adjacent to the side 72a of the pixel electrode 7 extending in the third direction, extends in the third direction.

The pixel electrode 7 has a side 73a extending in the fourth direction, crossing the first direction at a different angle from the second direction, and a side 93a of the slit 19, which is adjacent to the side 73a of the first electrode extending in the fourth direction, extends in the fourth direction.

The pixel electrode 7 has a side 74a extending in the fifth direction, symmetrical to the fourth direction with respect to the axis of the first direction or the direction orthogonal to the first direction, and a side 94a of the slit 19, which is adjacent to the side 74a of the pixel electrode 7 extending in the fifth direction, extends in the fifth direction.

[Second Embodiment]

Figure 6:
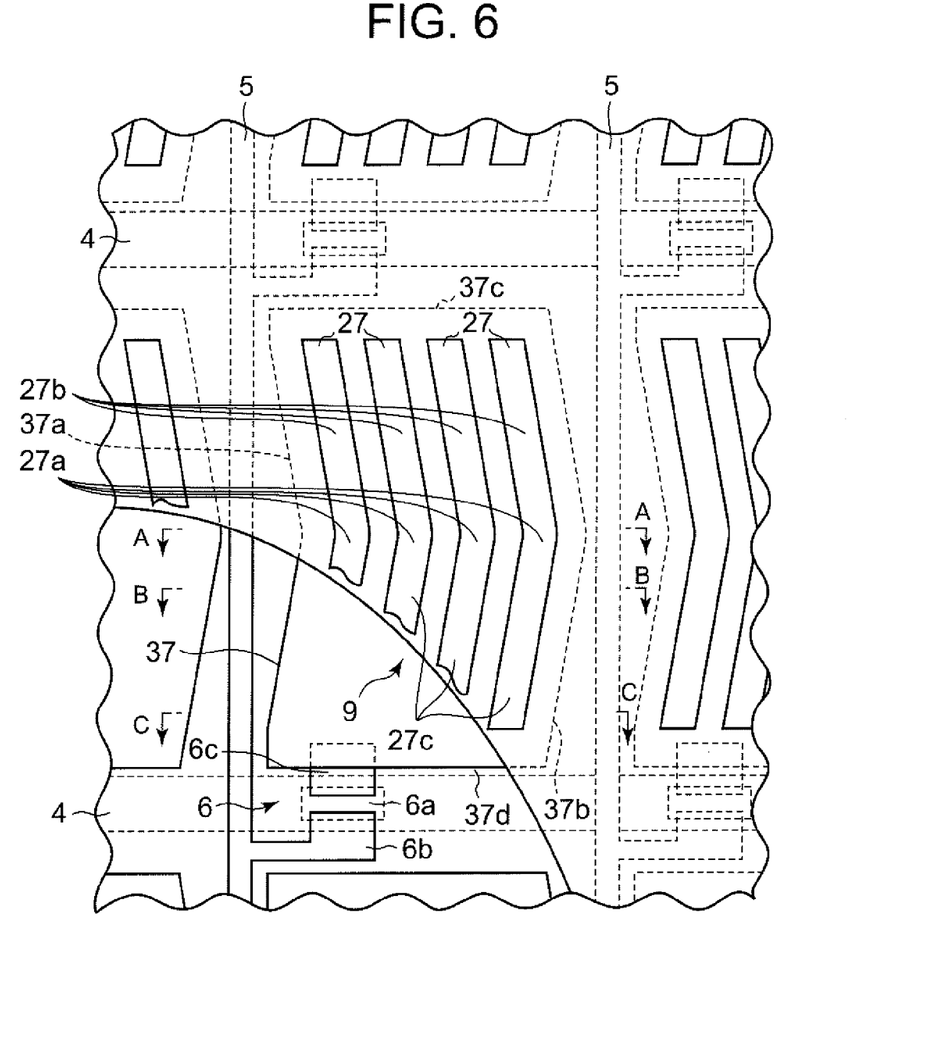
FIG. 6 is a plan view of a liquid crystal display device according to the second embodiment of the present invention.
Figure 7A:
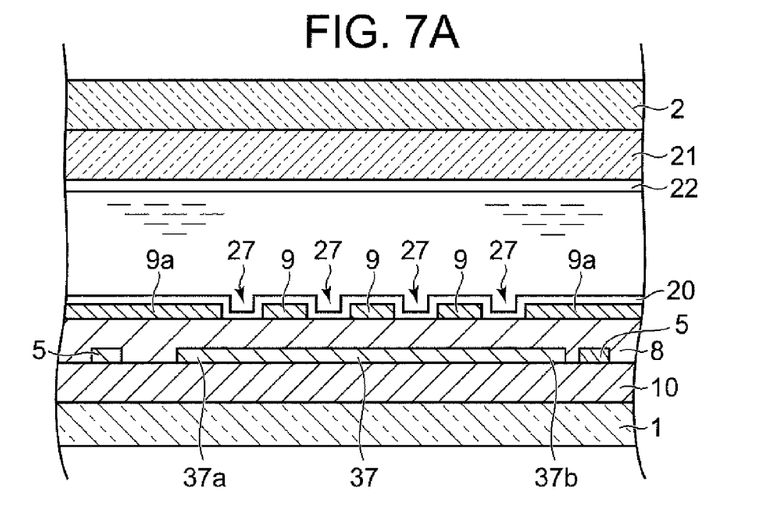
FIG. 7A is a cross-sectional view taken along the line of A-A of FIG. 6.
Figure 7B:
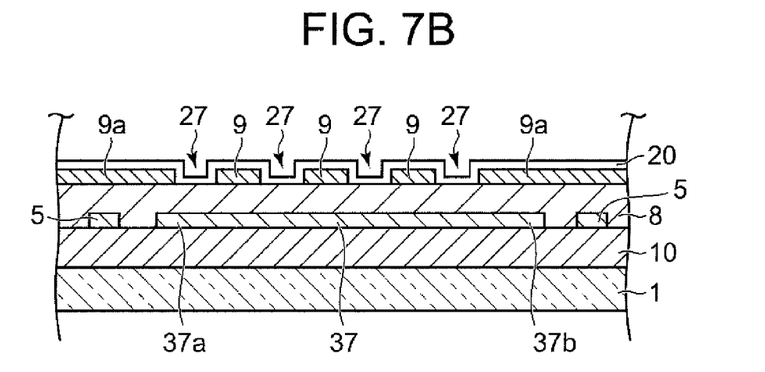
FIG. 7B is a cross-sectional view taken along the line of B-B of FIG. 6.
Figure 7C:
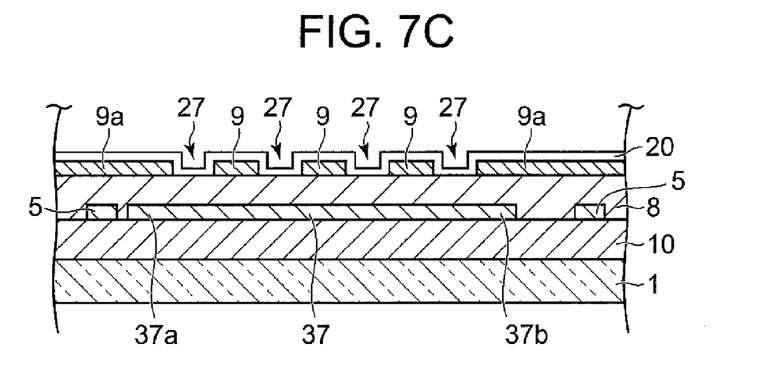
FIG. 7C is a cross-sectional view taken along the line of C-C of FIG. 6.

FIG. 6, FIG. 7A, FIG. 7B and FIG. 7C are illustrate a second embodiment of the present invention. FIG. 6 is a plan view of the second embodiment of the present invention. FIGS. 7A, 7B, and 7C are cross-sectional views of the liquid crystal device in FIG. 6 along the lines A-A, B-B, and C-C respectively. The same reference characters are assigned to the portions identical to those in the first embodiment. The liquid crystal layer and above in FIGS. 7B and 7C are not shown because they are the same as those in FIG. 7A.

The pixel electrode and the common electrode in the second embodiment differ from those in the first embodiment. The main portion 9c of the common electrode 9 in the second embodiment has the first slits only and does not include the second and the third slits. Namely, the first and the second embodiments are the same except that dog-leg-shaped slits 27 are formed on the common electrode 9 in the second embodiment. The difference between the two embodiments is detailed below.

Each of the slits 27 extends in the column direction, forming the dog-leg shape. The first elongated portion 27b and the second elongated portion 27c that extend in different slanting directions are connected at the bent portion 27a. In other words, the main portion 9c of the common electrode 9 has the slits 27 that bend in the middle of the column direction, extending toward the top and the bottom at specified angles of inclination. The slits 27 are aligned in the row direction in each unit area.

Each pixel electrode 37 has a left edge 37a running along the left data line 5, and a right edge 37b running along the right data line 5.

The right edge 37b of each pixel electrode 37 is bent into a shape similar to that of the corresponding bent portion 27a of the slits 27 at the position approximately at the center of the two adjacent scanning lines 4, where the right edge 37b comes closest to the right data line 5. The distance between the right edge 37b and the right data line 5 increases as the right edge 37b comes closer to the scanning lines 4.

Meanwhile, the left edge 37a of the pixel electrode 37 is bent into a shape similar to that of the corresponding bent portion 27a of the leftmost slit 27 at the position approximately at the center of the two adjacent scanning lines 4, where the left edge 37a remains farthest from the left data line 5.

As shown in FIG. 6, the right edge 37b and the left edge 37a of the pixel electrode 37 are formed approximately in parallel to each other. The right edge 37b of the pixel electrode 37 has sides running along the right data line 5 slanted toward the two adjacent scanning lines 4 respectively starting from the portion corresponding to the bent portion 27a of the slits 27.

As shown in the plan view in FIG. 6, the left edge 37a is formed on the left side of the left edge of the slit 27 that is placed far left and extending in the column direction. The right edge 37b is formed on the right side of the right edge of the slit 27 that is placed far right and extending in the column direction. The left and right edges 37a and 37b of the pixel electrode 37 are preferably inside the left and the right vertical edges 9a of the common electrode 9. An electric field is generated between the left or right vertical edges 9a and the left or right edges 37a or 37b of the pixel electrode 37, and the electric field control the each liquid crystal molecule in the liquid crystal layer 3.

As in the case of the first embodiment, the opening pattern of the common electrode 9 may be reversed. In this case, the shape of the left and the right edges of the pixel electrode is also reversed. In the example shown in FIGS. 6 and 7, the common electrode 9 is formed on the interlevel insulating layer 8 and the pixel electrodes 37 are formed under the interlevel insulating layer 8. However, this vertical relation between the pixel electrode 37 and the common electrode 9 with respect to the interlevel insulating layer 8 can also be reversed, with the pixel electrode 37 with slits 27 formed on the interlevel insulating layer 8 and a solid common electrode 9 under the interlevel insulating layer 8.

The present invention has been described above with reference to preferred embodiments. In the embodiment shown in FIG. 1, the pixel electrode 7 may be formed protruding over the bottom scanning line 4.

In the first embodiment, the right edge of the bent portion 17a of the rightmost first slit 17 may protrude over the right edge of the second slits 18 toward the right data line 5, on condition that the right edge of the pixel electrode corresponding to the bent portion 17a of the first slits 17 comes closest to the right data line 5 and that other portion of the right edge of the pixel electrode is far from the right data line 5.

The description of the first embodiment and the second embodiment given above assumes that each slit on the pixel electrode 7 is formed extending in the column direction and aligned in the row direction. However, the present invention is applicable to a case in which these slits are formed extending in the row direction and aligned in the column direction.

What is claimed is:

1. A liquid crystal display device comprising:
   a liquid crystal layer provided between a first substrate and a second substrate;
   a plurality of first electrodes, which are formed on the first substrate as a first layer, each of the plurality of first electrodes being electrically connected to a corresponding data line via a corresponding switching device; the data line extending in a first direction; and
   a second electrode, which is formed on the first substrate as a second layer, having at least one slit in each of pixel regions defined by the plurality of first electrodes, respectively,
   wherein said slit is entirely overlapped with a corresponding one of the plurality of first electrodes,
   wherein each of the plurality of first electrodes has a boundary line extending in a second direction, which is inclined relative to the first direction in which the data line extends, and another boundary line extending in a third direction, which is symmetrical to the second direction with respect to a virtual line orthogonal to the first direction,
   wherein said slit has a first region extending in the second direction, a second region extending in the third direction, and a bent portion that bridges the first region and the second region, and
   wherein the bend portion has a region extending in a fourth direction, which is a different direction from the second direction, and another region extending in a fifth direction, which is symmetrical to the fourth direction with respect to said virtual line orthogonal to the first direction.

2. The liquid crystal display device as set forth in claim 1, wherein each of the plurality of first electrodes has a boundary line extending in a sixth direction, which crosses the first direction at a different angle from the second direction, adjacent to one corner of the first electrode, and said slit has a third region connected to the first region and extending in the sixth direction.

3. The liquid crystal display device as set forth in claim 2, wherein each of the plurality of first electrodes has a boundary line extending in a seventh direction, which is symmetrical to the sixth direction with respect to said virtual line orthogonal to the first direction, adjacent to another corner of the first electrode opposite to said one corner, and the slit has a fourth region connected to the second region and extending in the seventh direction.

4. The liquid crystal display device as set forth in claim 3, wherein each of the plurality of first electrodes is formed such that respective boundary lines thereof extending in the sixth direction, the second direction, the fourth direction, the fifth direction, the third direction, and the seventh direction, respectively, appear in this order, and the slit is formed such that the third region, the first region, the bent portion, the second region, and the fourth region are connected in this order sequentially.

5. The liquid crystal display device as set forth in claim 1, wherein each of the plurality of first electrodes has a boundary line extending in the second direction, and a boundary line extending in the third direction adjacent to the corresponding data line.

6. The liquid crystal display device as set forth in claim 1, wherein each of the plurality of first electrodes is formed not to overlap with the corresponding data line.

7. The liquid crystal display device as set forth in claim 1, wherein an insulating film is formed as a third layer between the first and the second layers to electrically insulate the plurality of first electrodes and the second electrode from each other.

8. The liquid crystal display device as set forth in claim 1, wherein the second layer is formed closer to the liquid crystal layer than the first layer.

9. The liquid crystal display device as set forth in claim 1, wherein other slits having the same shape as said slit are formed adjacent to the slit in the second electrode in each of the pixel regions.

10. The liquid crystal display device as set forth in claim 9, wherein the other slits are entirely overlapped with the corresponding one of the plurality of first electrodes.

11. The liquid crystal display device as set forth in claim 1, wherein the plurality of first electrodes and the second electrode are made of ITO.

12. A liquid crystal display device comprising:
a liquid crystal layer provided between a first substrate and a second substrate;
a plurality of pixel electrodes, which are formed on the first substrate as a first layer, each of the plurality of pixel electrodes being electrically connected to a corresponding data line via a corresponding switching device the data line extending in a first direction; and
a common electrode, which is formed on the first substrate as a second layer, having at least one slit in each of pixel regions defined by the plurality of pixel electrodes, respectively,
wherein said slit is entirely overlapped with a corresponding one of the plurality of pixel electrodes,
wherein each of the plurality of pixel electrodes has a boundary line extending in a second direction, which is inclined relative to the first direction in which the data line extends; a boundary line extending in the third direction, which is symmetrical to the second direction with respect to a virtual line orthogonal to the first direction; a boundary line extending in a fourth direction, which crosses the first direction at a different angle from the second direction, and being connected to the boundary line extending in the second direction; and a boundary line extending in a fifth direction, which is symmetrical to the fourth direction with respect to said virtual line orthogonal to the first direction, and being connected to the boundary line extending in the third direction, and
wherein said slit has a first region extending in the second direction; a second region extending in the third direction; a third region extending in the fourth direction and connected to the first region; and a fourth region extending in the firth direction and connected to the second region.

13. A liquid crystal display device comprising:
a liquid crystal layer provided between a first and a second substrates;
a plurality of first electrodes, which are formed on the first substrate as a first layer, each of the plurality of first electrodes being electrically connected to a corresponding data line via a corresponding switching device, the data line extending in a first direction; and
a second electrode, which is formed on the first substrate as a second layer, having a pair of slits in each of pixel regions defined by the plurality of first electrodes, respectively, each pair of slits being symmetrically disposed with respect to a virtual line orthogonal to the first direction so as to have an upper slit located above the virtual line and a lower slit located below the virtual line in a plan view,
wherein the pair of slits is entirely overlapped with a corresponding one of the plurality of first electrodes,
wherein each of the plurality of first electrodes has a boundary line extending in a second direction, which is inclined relative to the first direction in which the data line extends; a boundary line extending in a third direction, which is symmetrical to the second direction with respect to said virtual line orthogonal to the first direction; a boundary line extending in a fourth direction, which crosses the first direction at a different angle from the second direction, and being connected to the boundary line extending in the second direction; and a boundary line extending in a fifth direction, which is symmetrical to the fourth direction with respect to said virtual line orthogonal to the first direction, and being connected to the boundary line extending in the third direction,
wherein the upper slit has a region extending in the second direction adjacent to the boundary line of the corresponding first electrode extending in the second direction, and a region extending in the fourth direction adjacent to the boundary line of the corresponding first electrode extending in the fourth direction, and
wherein the upper slit has a region extending in the third direction adjacent to the boundary line of the corresponding first electrode extending in the third direction, and a region extending in the fifth direction adjacent to the boundary line of the corresponding first electrode extending in the fifth direction.

* * * * *

UNITED STATES PATENT AND TRADEMARK OFFICE
CERTIFICATE OF CORRECTION

| | | |
|---|---|---|
| PATENT NO. | : 8,467,022 B2 | Page 1 of 1 |
| APPLICATION NO. | : 12/571654 | |
| DATED | : June 18, 2013 | |
| INVENTOR(S) | : Shinichi Shimomaki | |

It is certified that error appears in the above-identified patent and that said Letters Patent is hereby corrected as shown below:

In the Claims

Column 10, line 8, "switching device;" should b changed to --switching device,--.

Column 11, line 23, "switching device the" should be change to --switching device, the--; line 34, "in the third" should be changed to --in a third--.

Column 12, line 2, "in the firth direction" should be changed to --in the fifth direction--; line 42, "wherein the upper slit" should be changed to --wherein the lower slit--.

Signed and Sealed this
Thirtieth Day of July, 2013

Teresa Stanek Rea
*Acting Director of the United States Patent and Trademark Office*